(12) United States Patent
White et al.

(10) Patent No.: US 9,204,100 B2
(45) Date of Patent: *Dec. 1, 2015

(54) METHOD AND SYSTEM FOR PROVIDING SET-TOP BOX REMOTE ACCESS FUNCTIONS IN A BROWSER EXTENSION

(75) Inventors: Scott White, Austin, TX (US); James L. Cansler, Pflugerville, TX (US); Charles Scott, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1404 days.

This patent is subject to a terminal disclaimer.

(21) Appl. No.: 12/050,776

(22) Filed: Mar. 18, 2008

(65) Prior Publication Data

US 2009/0241143 A1    Sep. 24, 2009

(51) Int. Cl.
| | |
|---|---|
| H04N 21/81 | (2011.01) |
| H04N 21/422 | (2011.01) |
| H04N 21/4782 | (2011.01) |
| H04N 7/173 | (2011.01) |
| H04N 21/4147 | (2011.01) |
| H04N 21/4227 | (2011.01) |
| H04N 21/472 | (2011.01) |
| H04N 21/475 | (2011.01) |
| H04N 21/858 | (2011.01) |

(52) U.S. Cl.
CPC ....... *H04N 7/17318* (2013.01); *H04N 21/4147* (2013.01); *H04N 21/4227* (2013.01); *H04N 21/42204* (2013.01); *H04N 21/4753* (2013.01); *H04N 21/4782* (2013.01); *H04N 21/47214* (2013.01); *H04N 21/812* (2013.01); *H04N 21/818* (2013.01); *H04N 21/8586* (2013.01)

(58) Field of Classification Search
CPC .......... H04N 21/818; H04N 21/42204; H04N 21/4782
USPC ......... 725/37–39, 52, 61, 105, 109, 110, 112, 725/131, 40, 48, 51, 53, 55; 709/218; 715/207, 208, 231, 248
See application file for complete search history.

(56) References Cited

U.S. PATENT DOCUMENTS

| | | | |
|---|---|---|---|
| 6,205,485 B1 | 3/2001 | Kikinis | |
| 6,567,800 B1 | 5/2003 | Barrera et al. | |
| 6,907,425 B1 | 6/2005 | Barrera et al. | |
| 7,293,066 B1 | 11/2007 | Day | |
| 7,305,693 B2 * | 12/2007 | Blackketter et al. | ............ 725/61 |
| 2002/0174187 A1 | 11/2002 | Kollar et al. | |
| 2003/0070005 A1 * | 4/2003 | Mukundan et al. | ........... 709/330 |
| 2004/0268403 A1 * | 12/2004 | Krieger et al. | ................ 725/112 |
| 2006/0004732 A1 | 1/2006 | Odom | |
| 2006/0129910 A1 * | 6/2006 | Djabarov | ................... 715/501.1 |
| 2006/0167903 A1 | 7/2006 | Smith et al. | |

(Continued)

*Primary Examiner* — Benjamin R Bruckart
*Assistant Examiner* — Jason Thomas
(74) *Attorney, Agent, or Firm* — Guntin & Gust, PLC; Douglas Schnabel

(57) ABSTRACT

A method and a system for providing remote set-top box access functions in an Internet browser extension is disclosed. Web page content of a currently viewed web page is compared to an entertainment content database. The web page content is determined to be associated with entertainment content in the entertainment content database. Also, it is determined that there is a media manipulation action for the entertainment content, and a notification that the media manipulation action is available for the entertainment content is displayed.

17 Claims, 6 Drawing Sheets

(56) References Cited

U.S. PATENT DOCUMENTS

| | | |
|---|---|---|
| 2007/0044127 A1 | 2/2007 | Vaysman et al. |
| 2007/0192181 A1* | 8/2007 | Asdourian ..................... 705/14 |
| 2007/0266406 A1* | 11/2007 | Aravamudan et al. .......... 725/57 |
| 2007/0277201 A1 | 11/2007 | Wong et al. |
| 2007/0294726 A1* | 12/2007 | Drazin ............................ 725/87 |
| 2008/0212941 A1* | 9/2008 | Lillethun et al. .............. 386/124 |

* cited by examiner

METHOD AND SYSTEM FOR PROVIDING SET-TOP BOX REMOTE ACCESS FUNCTIONS IN A BROWSER EXTENSION

FIELD OF THE DISCLOSURE

The present disclosure generally relates to communications networks, and more particularly relates to remote access of a set-top box.

BACKGROUND

Users often encounter references to entertainment content while browsing web pages such as news stories, blog entries, and the like. For example, the user might read a news story about a television show. If the user is interested in recording that television show, they typically have to manually set their digital video recorder (DVR). Alternatively, if the user has a DVR offering remote Internet access capability, the user can navigate to a remote access web application to schedule the recording.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 is an exemplary screen shot of a web page scanned by a web browser plug-in:

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
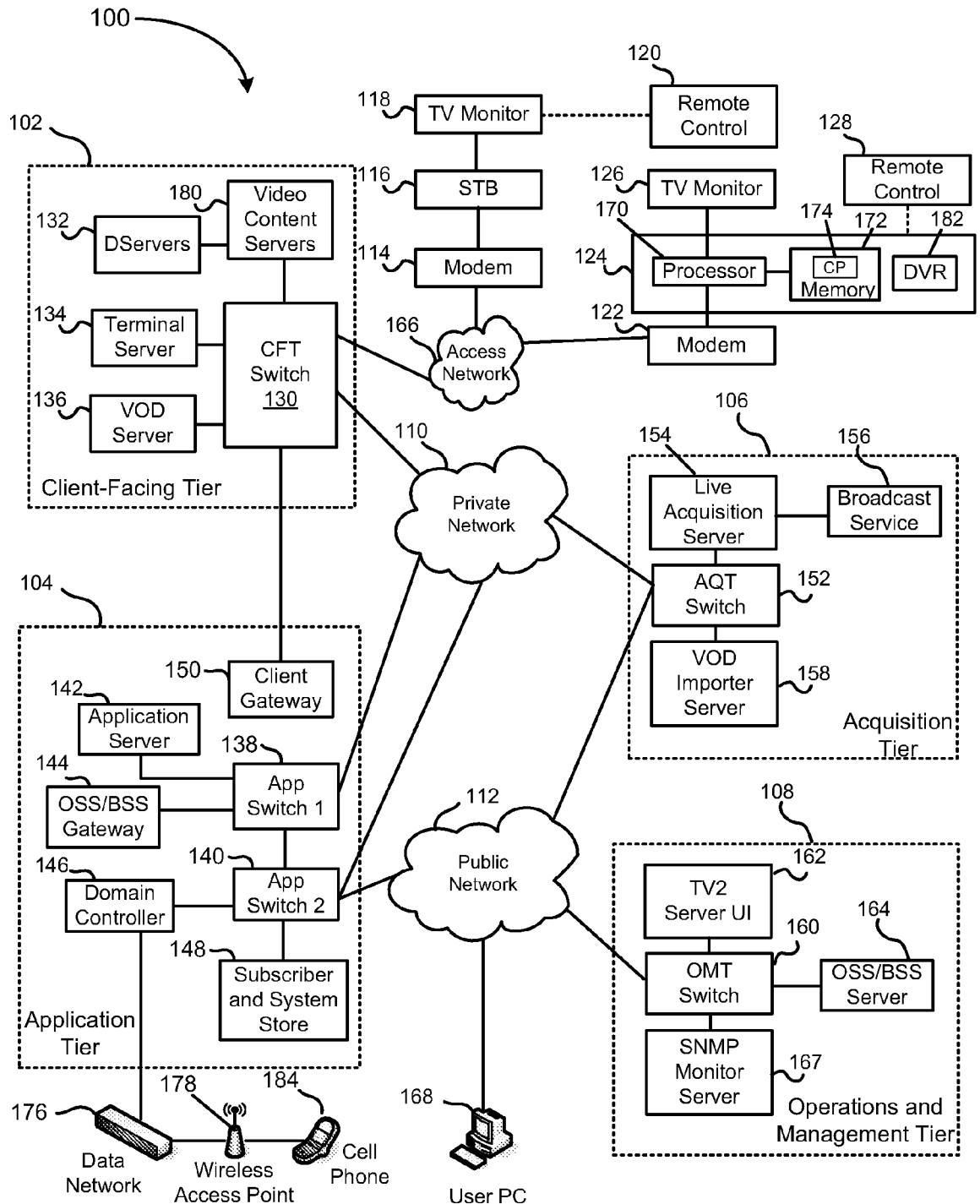
FIG. 1 is a block diagram illustrating an Internet Protocol Television (IPTV) network.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

In a particular embodiment, the web portal displayed by the domain controller can be a remote set-top box access website that allows the user to control different features on the set-top box devices 116 and 124. The different features can include setting a television program to be recorded, setting a reminder for a television program, scheduling a VOD movie for download, and the like. These features can be saved on the remote set-top box access website and then sent to the STB computer program 174 of the second set-top box device 124 to be executed. While the user is accessing the remote set-top box access website, the domain controller 146 can display an offer to install a web browser plug-in on the PC 168. If the user selects the offer to install the web browser plug-in, the PC 168 can receive instructions from the domain controller to download and install the web browser plug-in.

After being installed on the PC 168, the web browser plug-in can embed the remote set-top box access functionality of the web portal into the web browser of the PC 168 itself, such as setting a television program to be recorded. The web browser plug-in can scan any web page accessed by the PC 168 over the public network 112 for text, objects, and advertisement meta-data that might be related to entertainment content. The entertainment content can be VOD movies, television programs, and the like that can be accessed by the set-top box devices 116 and 124 from the IPTV system 100 and then displayed on the display devices 118 and 126. The advertisement meta-data can be the hypertext markup language (HTML) tag data associated with embedded advertisements, such as banner advertisement, whereby the HTML tag data can make the advertisements capable of being scanned for entertainment content. The web browser plug-in can compare the text strings and meta-data from a web page to an entertainment content database of a backend server to determine whether the text string and/or meta-data are associated with the entertainment content.

The backend server can be the VOD servers 136, the live acquisition server 154, the video content servers 180, and the like of the IPTV system 100. The backend servers can store the titles of television programs that can be recorded by the DVR 182 of the second set-top box device 124 and the titles of VOD movies that can be downloaded by the second set-top box device. Upon the web browser plug-in determining that the text string and/or the meta-data are associated with entertainment content, the web browser plug-in can determine whether there is a media manipulation action available for the entertainment content. The media manipulation action may be any action that the set-top box devices 116 and 124 can perform, such as downloading a VOD, scheduling a recording of a television program on the DVR 182, setting a reminder for a television program, and the like.

If the web browser plug-in determines that a media manipulation action is available, then the web browser plug-in can notify the user that the media manipulation action is available. The web browser plug-in can notify the user by displaying a blinking browser toolbar icon, by highlighting or underlining the corresponding text string, and the like. The user can select the notification, by clicking on either the blinking browser icon or the corresponding text string, to set the media manipulation action for the related entertainment content. Upon selection of the notification, the web browser plug-in can provide the user with media manipulation controls for the entertainment content similar to those available through the remote set-top box access web portal. Upon receiving the media manipulation action, the web browser plug-in can send the media manipulation action to either the set-top box devices 116 and 124 and/or the remote set-top box access web portal, so that the set-top box devices can perform the requested media manipulation action.

In alternative embodiments, web browser plug-in functions can be extended to include other online service interactions, such as online rental of digital video discs (DVDs). The web browser plug-in can compare the text and meta-data to both television program databases and DVD movie databases. Alternatively, a separate DVD web browser plug-in can be installed for comparing the text and meta-data to only databases of online rental of DVDs. The DVD web browser plug-in can scan web page text, objects, and advertisement meta-data looking for references to DVD titles stored in an online library. If applicable DVD titles are found, the DVD web browser plug-in can provide the user with the ability to add selected DVD titles to a DVD rental queue directly from the current web page being viewed.

Figure 2:
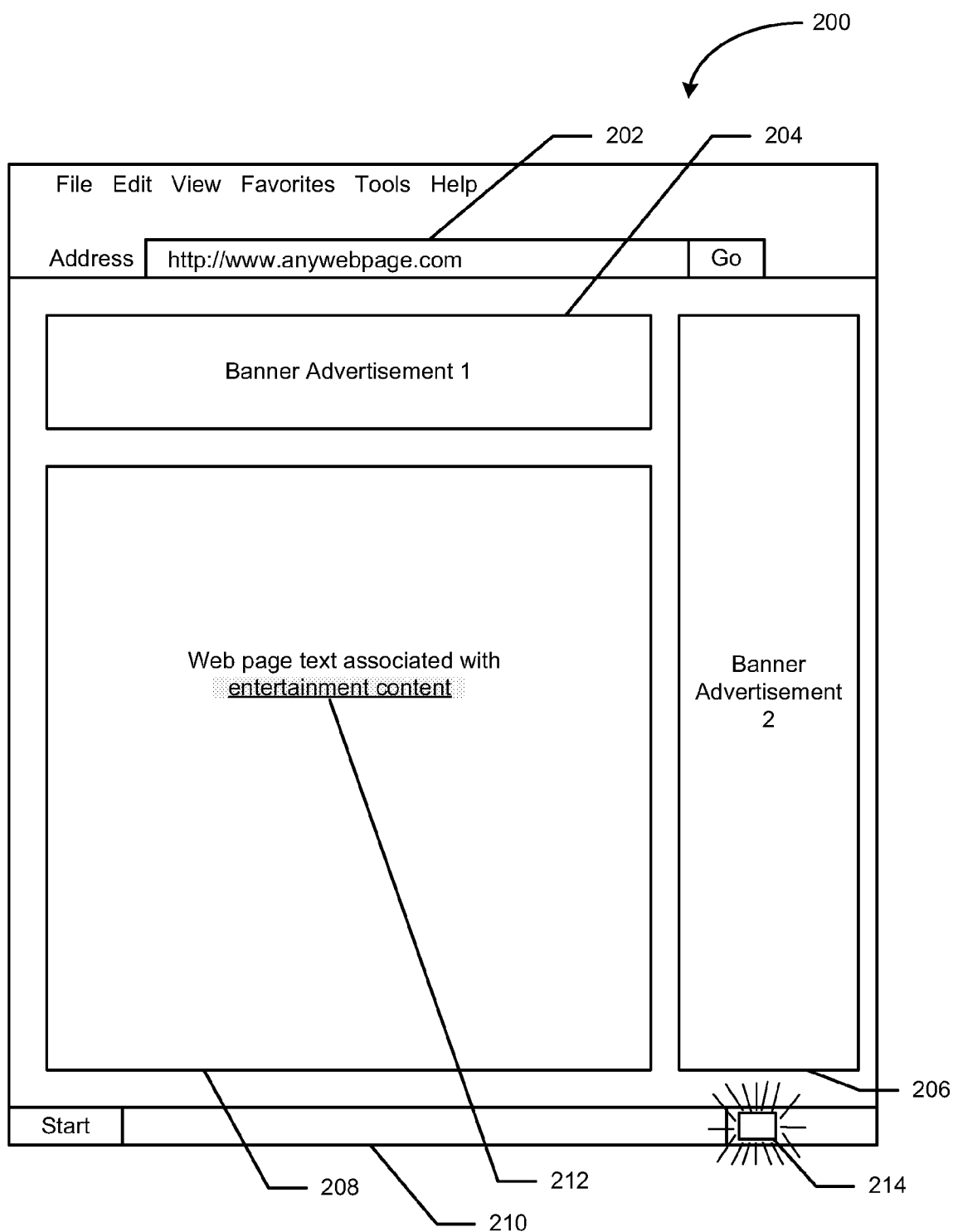

FIG. 2 shows an exemplary screen shot of a web page 200 that can be scanned by the web browser plug-in for entertainment content. The web page 200 includes an address line 202, a first banner advertisement 204, a second banner advertisement 206, a web page text box 208, and a tool bar 210. The web page text box 208 can include entertainment content text 212, and the tool bar 210 can include a web browser tool bar icon 214. As the user views the web page 200, such as anywebpage.com shown in the address line 202, the web browser plug-in can scan the web page text box 208 and the meta-data associated with the first and second banner advertisements 204 and 206. The web browser plug-in can compare the text and meta-data to the entertainment content stored on the backend servers. If the text or meta-data is associated with entertainment content and media manipulation actions are available for the entertainment content, the web browser plug-in can highlight or underline the corresponding text string, such as the entertainment content text 212, or make the web browser tool bar icon 214 blink as shown in FIG. 2. Upon clicking on the entertainment content text 212 or the web browser tool bar icon 214, the user can be provided with controls to set the media manipulation actions for the entertainment content on the set-top box devices 116 and 124.

Figure 3:
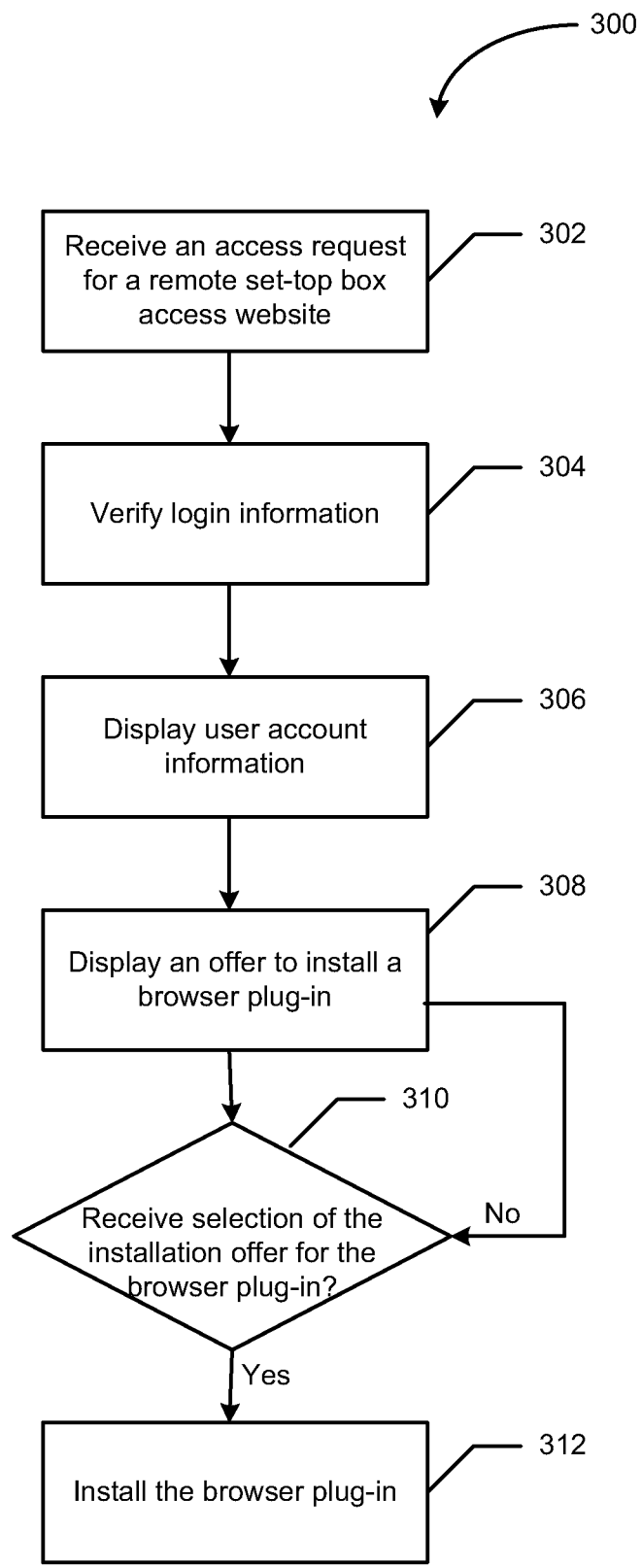
FIG. 3 is a flow chart of a method for installing a browser extension for remote access to a set-top box device.

FIG. 3 shows a flow diagram of a method 300 for installing a web browser extension for remote access of a set-top box device. At block 302, an access request is received for a remote set-top box access website from the personal computer. The remote set-top box website can provide a user with the ability to set a set-top box, on a user account, to record a specific television program. Login information for the remote set-top box access website is received and verified at block 304. At block 306, after the login information is verified, the user account information is displayed on a graphical user interface (GUI) of the remote set-top box access website. The user account information can include the number of set-top boxes associated with the user account, the option to set a set-top box to record a television program, the option to set a VOD movie for download, and the like.

An offer to install the web browser plug-in is displayed on the GUI of the remote set-top box access website at block 308. The offer can be displayed on any part of the remote set-top box access website, as a pop-up window and the like. Additionally, the offer to install the web browser plug-in can be a clickable offer, so that the user can select the option to download and install the web browser plug-in by clicking on the offer to install. At block 310, a determination is made whether or not a selection of the offer to install the browser plug-in is received. If the selection of the offer to install the browser plug-in is not received then the flow diagram continues at block 302 as stated above. However, if the offer to install the browser plug-in is selected, then the browser plug-in is downloaded and installed on the personal computer at block 312.

Figure 4:
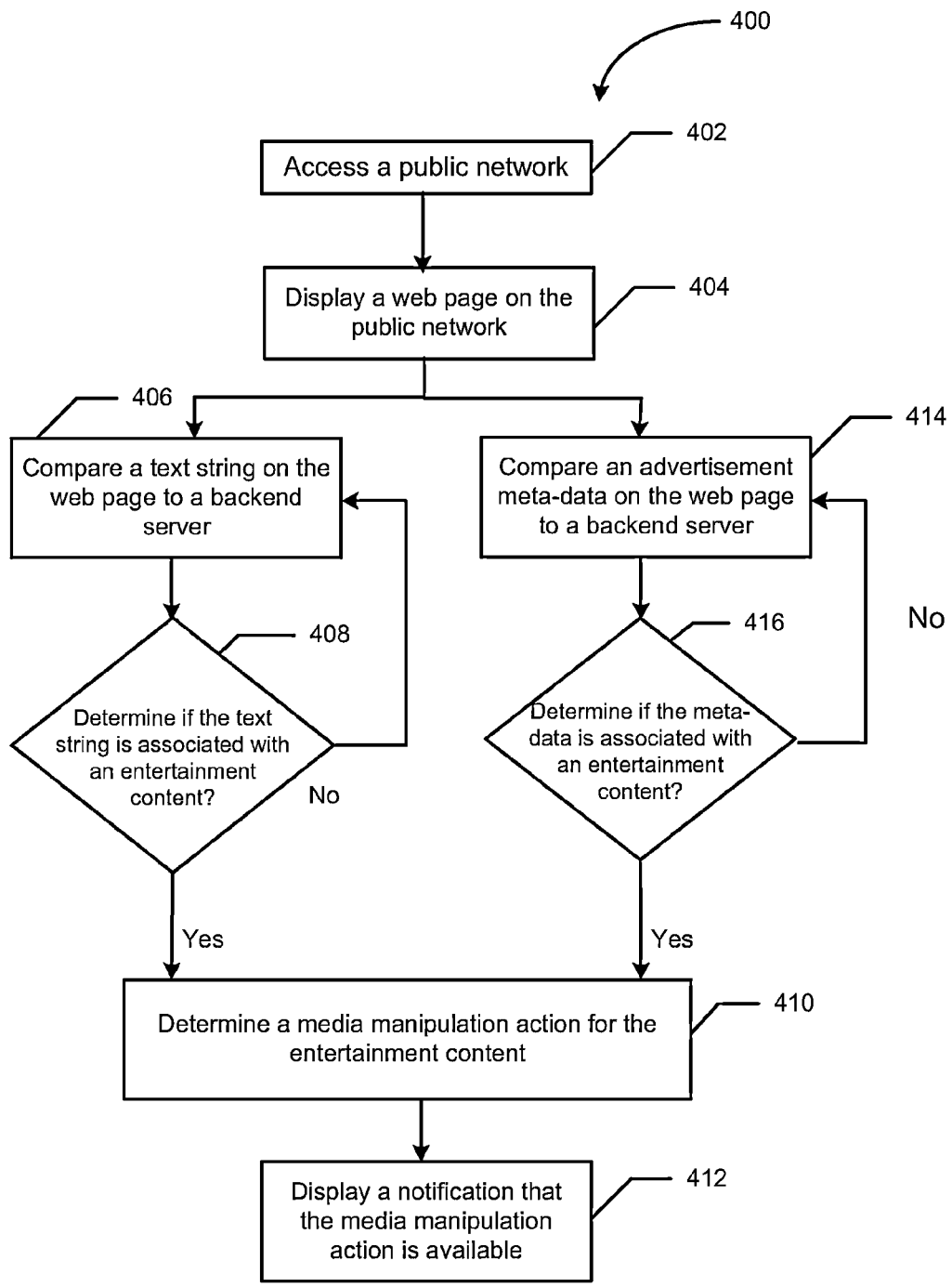
FIG. 4 is a flow chart of a method for displaying a notification that a media manipulation action is available for a specific entertainment content.

FIG. 4 shows a flow diagram of a method 400 for displaying a notification that a media manipulation action is available for a specific entertainment content. At block 402, a public network is accessed by a personal computer. A web page is displayed on the personal computer through a public network at block 404. At block 406, a text string located on the web page is compared to a backend server by the web browser plug-in. A determination is made whether text string is associated with an entertainment content stored on an entertainment content database of the backend server at block 408. If the text string is not associated with the entertainment content stored on the backend server, then a new text string on the web page is compared to the backend server at block 406. If the text string is associated with the entertainment content, then a media manipulation action for the entertainment content is determined at block 410. At block 412, a notification that the media manipulation action is available on the entertainment content is displayed. The notification can be displayed as a blinking browser icon, a highlighted text string, an underlined text string, and the like.

At block 414, a meta-data associated with an embedded advertisement located on the web page is compared to the entertainment database of the backend server. A determination is made whether the meta-data is associated with an entertainment content at block 416. If the meta-data is not associated with the entertainment content stored on the backend server, then a new advertisement meta-data on the web page is compared to the backend server at block 414. If the meta-data is associated with the entertainment content, then a media manipulation action for the entertainment content is determined at block 410. At block 412, a notification that the media manipulation action is available on the entertainment content is displayed.

Figure 5:
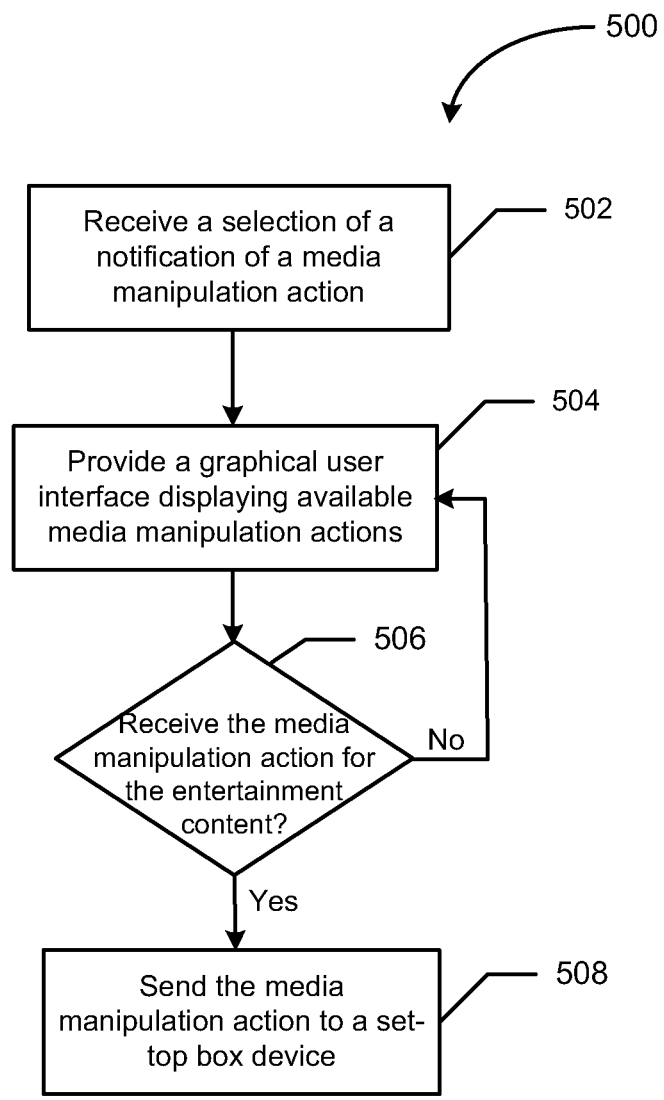
FIG. 5 is a flow chart of a method for sending a media manipulation action for a specific entertainment content to a set-top box device.

FIG. 5 shows a flow diagram of a method 500 for sending a media manipulation action for a specific entertainment content to a set-top box device. At block 502, a selection of a notification of an available media manipulation action is received. The notification can be selected by the browser icon, the highlighted text string, the underlined text string, and the like being clicked. A GUI displaying the available media manipulation actions is provided at block 504. At block 506, a determination is made whether a selection of the media manipulation action for an entertainment content is received. If the selection of the media manipulation action is not received, then the GUI is continually provided at block 504. If the media manipulation action is received, then the media manipulation action is sent to a set-top box at block 508.

Figure 6:
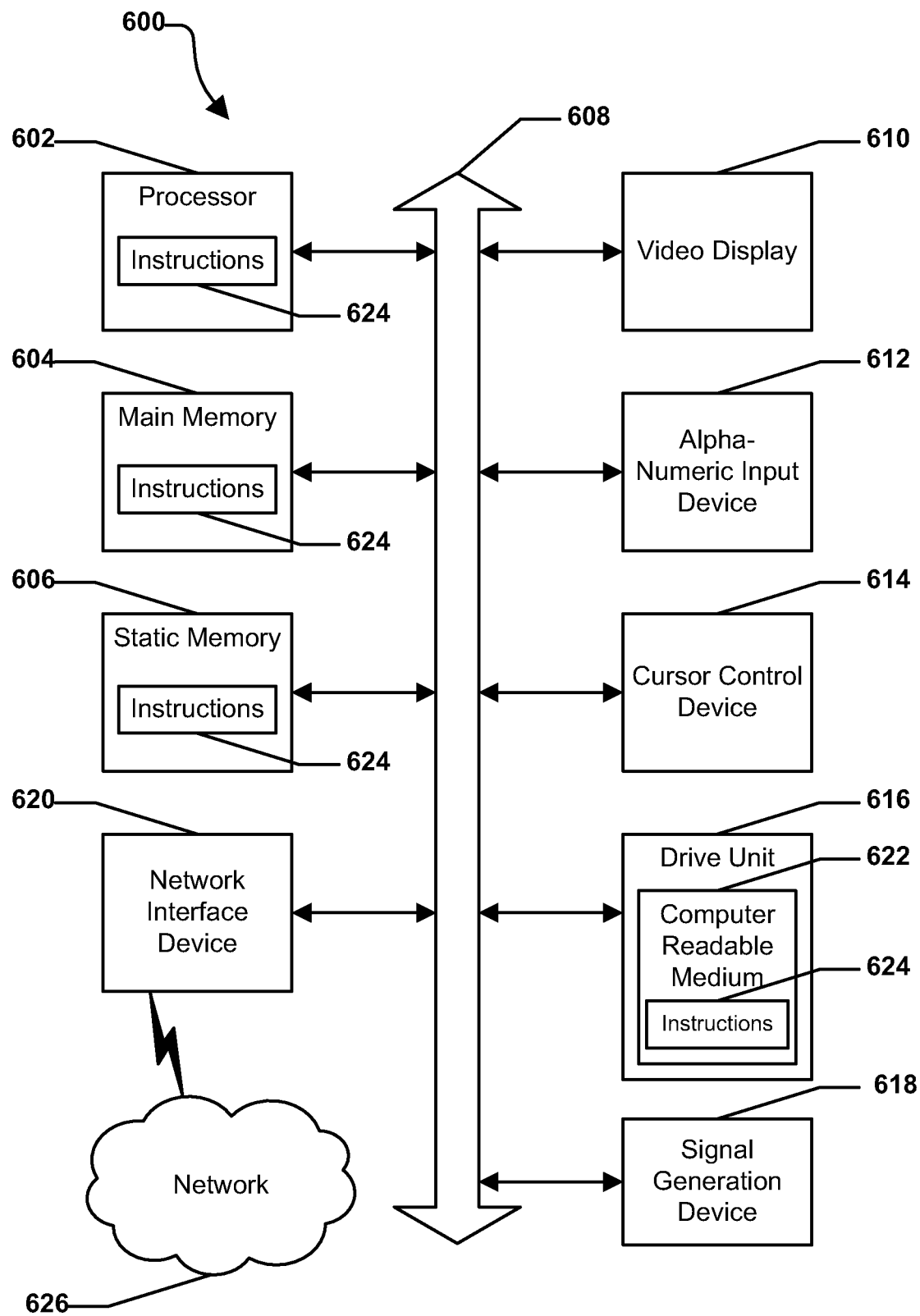
FIG. 6 is a block diagram of a general computer system.

FIG. 6 shows an illustrative embodiment of a general computer system 600 in accordance with at least one embodiment of the present disclosure. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   scanning, by a system comprising a processor, one of a text box of a web page or meta-data associated with a banner advertisement of the web page to identify web page content;
   comparing, by the system, the web page content to a television program database and a digital video disc movie database;

determining, by the system, whether the web page content is associated with entertainment content in the television program database or the digital video disc movie database according to the comparing;

determining, by the system, a media manipulation action for the entertainment content when the web page content is associated with the entertainment content;

displaying, by the system, a notification at the web page that the media manipulation action is available for the entertainment content, wherein the notification comprises a browser toolbar icon that is displayed at the web page;

detecting, by the system, a selection of the notification;

displaying, by the system, a media manipulation control, responsive to the selection of the notification and associated with the media manipulation action for the entertainment content;

receiving, by the system, a selection of the media manipulation control;

sending, by the system, the media manipulation action to a set-top box device responsive to the selection of the media manipulation control to remotely control the set-top box from the web page if the web page content is associated with entertainment content in the television program database; and sending, by the system, the media manipulation action to a digital video disc rental service responsive to the selection of the media manipulation control if the web page content is associated with entertainment content in the digital video disc movie database.

2. The method of claim 1 further comprising:
determining, by the system, that the entertainment content is provided by a service account;
providing, by the system, controls to perform the media manipulation action on the service account; and
storing, by the system, the media manipulation action to the service account.

3. The method of claim 1 wherein the entertainment content is selected from a group consisting of a television program, a video on demand movie, and a digital video disc movie.

4. The method of claim 1 wherein the media manipulation action is selected from a group consisting of scheduling a digital video recorder recording, and downloading a video on demand.

5. The method of claim 1 wherein displaying the notification further comprises blinking a browser toolbar icon or highlighting a text string associated with the entertainment content.

6. The method of claim 1 wherein displaying the notification further comprises:
underlining, by the system, a text string associated with the entertainment content.

7. A method comprising:
scanning, by a system comprising a processor, one of a text box of a web page or meta-data associated with a banner advertisement of the web page to identify web page content;
comparing, by a the system, the web page content to a television program database and a digital video disc movie database;
determining, by the system, whether the web page content is associated with entertainment content in the television program database or the digital video disc movie database according to the comparing;

determining, by the system, a media manipulation action for the entertainment content when the text string is associated with the entertainment content;

displaying, by the system, a notification at the web page that the media manipulation action is available for the entertainment content, wherein the notification comprises a browser toolbar icon that is displayed at the web page;

detecting, by the system, a selection of the notification;

displaying, by the system, a media manipulation control, responding to the selection of the notification and corresponding to the media manipulation action for the entertainment content;

receiving, by the system, a selection of the media manipulation control;

sending, by the system, the media manipulation action to a set-top box device responsive to the selection of the media manipulation control to remotely control the set-top box from the web page if the text string is associated with entertainment content in the television program database; and sending, by the system, the media manipulation action to a digital video disc rental service responsive to the selection of the media manipulation control if the text string is associated with entertainment content in the digital video disc movie database.

8. The method of claim 7 further comprising:
providing, by the system, a remote access to the set-top box device.

9. The method of claim 7 wherein displaying the notification further comprises blinking a browser toolbar icon or highlighting the text string associated with the entertainment content.

10. The method of claim 7 wherein the entertainment content is selected from a group consisting of a television program, a video on demand movie, and a digital video disc movie.

11. The method of claim 7 wherein the media manipulation action is selected from a group consisting of scheduling a digital video recorder recording, and downloading a video on demand.

12. A computer readable device comprising a plurality of computer instructions, which, responsive to execution by a processor, cause the processor to perform operations comprising:
scanning one of a text box of a web page or meta-data associated with a banner advertisement of the web page to identify web page content;
comparing the web page content to a television program database and a digital video disc movie database;
determining whether the web page content is associated with entertainment content in the television program database or the digital video disc movie database according to the comparing;
determining a media manipulation action for the entertainment content when the web page content is associated with the entertainment content;
displaying a notification at the web page that the media manipulation action is available for the entertainment content, wherein the notification comprises a browser toolbar icon that is displayed at the web page;
detecting a selection of the notification;
displaying a media manipulation control, responsive to the selection of the notification and associated with the media manipulation action for the entertainment content;
receiving a selection of the media manipulation control;

sending the media manipulation action to a set-top box device responsive to the selection of the media manipulation control to remotely control the set-top box from the web page if the web page content is associated with entertainment content in the television program database; and sending the media manipulation action to a digital video disc rental service responsive to the selection of the media manipulation control if the web page content is associated with entertainment content in the digital video disc movie database.

13. The computer readable device of claim 12, wherein the computer instructions further cause the processor to perform operations comprising:

determining that the entertainment content is provided by a service account;

providing controls to perform the media manipulation action on the service account; and storing the media manipulation action to the service account.

14. The computer readable device of claim 12 wherein the entertainment content is selected from a group consisting of a television program, a video on demand movie, and a digital video disc movie.

15. The computer readable device of claim 12 wherein the media manipulation action is selected from a group consisting of scheduling a digital video recorder recording, and downloading a video on demand.

16. The computer readable device of claim 12 wherein displaying the notification further comprises blinking a browser toolbar icon; and highlighting a text string associated with the entertainment content.

17. The computer readable device of claim 12 wherein displaying the notification further comprises:

underlining a text string associated with the entertainment content.

* * * * *